US012587104B2

(12) United States Patent
Yang et al.

(10) Patent No.: US 12,587,104 B2
(45) Date of Patent: Mar. 24, 2026

(54) DC-DC CONVERTER FOR BATTERY CHARGING CIRCUIT

(71) Applicant: MPS KOREA CO., LTD., Yongin-si (KR)

(72) Inventors: In Ha Yang, Yongin-si (KR); Ki Il Yang, Seoul (KR)

(73) Assignee: MPS KOREA CO., LTD., Yongin-si (KR)

( * ) Notice: Subject to any disclaimer, the term of this patent is extended or adjusted under 35 U.S.C. 154(b) by 189 days.

(21) Appl. No.: 18/395,896

(22) Filed: Dec. 26, 2023

(65) Prior Publication Data

US 2025/0096693 A1 Mar. 20, 2025

(30) Foreign Application Priority Data

Sep. 19, 2023 (KR) ........................ 10-2023-0124711
Nov. 20, 2023 (KR) ........................ 10-2023-0161046

(51) Int. Cl.
| | |
|---|---|
| *H02M 3/335* | (2006.01) |
| *H02J 7/04* | (2006.01) |
| *H02M 1/00* | (2007.01) |
| *H02M 1/42* | (2007.01) |
| *H02M 3/00* | (2006.01) |

(52) U.S. Cl.
CPC ........... *H02M 3/33573* (2021.05); *H02J 7/04* (2013.01); *H02M 1/4241* (2013.01); *H02M 3/01* (2021.05); *H02M 3/33507* (2013.01)

(58) Field of Classification Search
CPC ......... H02M 3/33571; H02M 3/33573; H02M 3/33507; H02M 1/0058; H02M 1/4241; H02M 1/0043; H02M 1/0093; H02J 7/02; H02J 7/04
See application file for complete search history.

(56) References Cited

U.S. PATENT DOCUMENTS

| | | | | |
|---|---|---|---|---|
| 5,838,558 A | * | 11/1998 | Tan ..................... | H02M 3/3376 363/91 |
| 6,055,169 A | * | 4/2000 | Bowman ........... | H02M 3/33561 363/71 |
| 8,842,450 B2 | * | 9/2014 | Jungreis .................. | H02M 3/01 363/21.03 |
| 12,095,381 B2 | * | 9/2024 | Yenduri ............. | H02M 5/4585 |
| 2007/0086224 A1 | * | 4/2007 | Phadke ................. | H02M 3/285 363/65 |
| 2015/0180345 A1 | * | 6/2015 | Frost ................... | H02M 3/3376 363/21.02 |
| 2018/0091059 A1 | * | 3/2018 | Nene ..................... | H02M 1/084 |
| 2020/0266713 A1 | * | 8/2020 | Leibl .................. | H02M 1/0043 |

FOREIGN PATENT DOCUMENTS

KR 1020120134731 A 12/2012

* cited by examiner

*Primary Examiner* — Sisay G Tiku
(74) *Attorney, Agent, or Firm* — Nicholas Park

(57) ABSTRACT

Disclosed is a converting circuit for an on-board charging device. The converting circuit for the on-board charging device includes a first resonant converter; a second resonant converter; a phase shift full-bridge converter; and a controller.

4 Claims, 15 Drawing Sheets

DC-DC CONVERTER FOR BATTERY CHARGING CIRCUIT

CROSS-REFERENCE TO RELATED APPLICATION(S)

This application claims priority from and the benefit of Korean Patent Application No. 10-2023-0124711 filed on Sep. 19, 2023, and Korean Patent Application No. 10-2023-0161046 filed on Nov. 20, 2023, which are hereby incorporated by reference in their entireties.

BACKGROUND

1. Field

The present disclosure relates to a converting circuit and more particularly, to a converting circuit for an on-board charging device.

2. Related Art

Charging methods for an electric vehicle (EV) may be broadly classified into three types.

A first type of method is an onboard charger (OBC) method. An onboard charger is a device that converts alternating current (AC) power input to a vehicle to direct current (DC) power when slowly charging an electric vehicle or when charging the electric vehicle by plugging the same into a home plug with a portable charger. The onboard charger is similar to an inverter in terms of converting AC to DC.

A second type of method is an external charger method or a standard charging method. An external charger is any charging system that is configured to be supplied with power from an external power supply facility and includes a stand, a cable, and a coupler for single-phase AC connection. The external charger is a charger that charges a storage battery through an onboard charger of an electric vehicle.

A third type of method is a charger station or a high-speed charging method. The charger station operates by directly supplying DC power from a charger to a battery of an electric vehicle.

Here, the onboard charger is installed as a standard in an electric vehicle due to its small size, reasonable price, and convenience of directly charging a battery pack from AC power of a utility line.

A reference material includes, for example, Korean Patent Laid-Open Publication No. 10-2012-0134731.

SUMMARY

The present disclosure is conceived to outperform the issues found in the art and at least one example embodiment provides a converting circuit for an on-board charging device.

The technical subjects of the present disclosure are not limited to the aforementioned technical subjects and other technical subjects not described herein may be clearly understood by one of ordinary skill in the art from the following description.

According to an example embodiment to outperform the issues, disclosed is a converting circuit for an on-board charging device. The converting circuit for the on-board charging device may include a first resonant converter including at least two first switching elements and configured to output a first output voltage under constant voltage control to follow a predetermined ratio of a minimum voltage of a battery connected to an output terminal according to a first control signal that is input to the at least two first switching elements; a second resonant converter including at least two second switching elements and configured to output a second output voltage under constant voltage control to follow the predetermined ratio of the minimum voltage of the battery according to a second control signal that is input to the at least two second switching elements; a phase shift full-bridge converter configured to transmit, to an output terminal, at least a portion of a direct current (DC) voltage that is transmitted from an input terminal due to a phase shift between the first control signal and the second control signal generated according to an operating mode of the battery; and a controller configured to generate a first control signal and a second control signal for determining a switching frequency to follow the predetermined ratio of the minimum voltage of the battery, and to generate a pulse of generating a phase shift between the first control signal and the second control signal for constant current control that follows a reference current value set to correspond to a charging or discharging section of the battery or for constant voltage control that follows a difference value between a maximum voltage and a minimum voltage of the battery.

Also, the first resonant converter may be configured to connect to an input terminal and to transmit at least a portion of a DC voltage that is transmitted from the input terminal to a first output terminal through a first transformer according to the first control signal that is input to the at least two first switching elements, the second resonant converter may be configured to connect to the input terminal and to transmit at least a portion of the DC voltage that is transmitted from the input terminal to a second output terminal through a second transformer according to the second control signal that is input to the at least two second switching elements, and the phase shift full-bridge converter may include a third transformer, and may be configured to transmit at least a portion of the DC voltage that is transmitted from the input terminal to a third output terminal through the third transformer according to the phase shift between the first control signal and the second control signal and a turns ratio of an input terminal and an output terminal of the third transformer.

Also, the first resonant converter may include a (1-1)-th switching element of which an operating mode is controlled in response to the first control signal being input to a gate node, of which a drain node is connected to one end of the input terminal, and of which a source node is connected to one end of the phase shift full-bridge converter; a (1-2)-th switching element of which an operating mode is controlled in response to the first control signal being input to a gate node, of which a drain node is connected to the source node of the (1-1)-th switching element, and of which a source node is connected to a ground node; a (1-1)-th resonant inductor of which one end is connected to the drain node of the (1-1)-th switching element; a (1-2)-th resonant inductor of which one end is connected to another end of the (1-1)-th resonant inductor and which is connected in parallel to an input terminal of the first transformer; a first resonant capacitor of which one end is connected to another end of the (1-2)-th resonant inductor and of which another end is connected to the source node of the (1-1)-th switching element; and the first transformer of which the input terminal is connected in parallel to the (1-2)-th resonant inductor and of which an output terminal is connected to the first output terminal, and the second resonant converter may include a (2-1)-th switching element of which an operating mode is controlled in response to the second control signal being input to a gate node, of which a drain node is connected to one end of the input terminal, and of which a source node is connected to another end of the phase shift full-bridge converter; a (2-2)-th switching element of which an operating mode is controlled in response to the second control signal being input to a gate node, of which a drain node is connected to the source node of the (2-1)-th switching element, and of which a source node is connected to a ground node; a (2-1)-th resonant inductor of which one end is connected to the drain node of the (2-2)-th switching element; a (2-2)-th resonant inductor of which one end is connected to another end of the (2-1)-th resonant inductor and which is connected in parallel to an input terminal of the second transformer; a second resonant capacitor of which one end is connected to another end of the (2-2)-th resonant inductor and of which another end is connected to the source node of the (2-2) switching element; and a second transformer of which the input terminal is connected in parallel to the (2-2)-th resonant inductor and of which an output terminal is connected to the second output terminal.

Also, the phase shift full-bridge converter may further include a first diode, a second diode, and a third diode; a third inductor; and a third capacitor. In the third transformer, one end of the input terminal may be connected to the source node of the (1-1)-th switching element and another end of the input terminal may be connected to the source node of the (2-1)-th switching element, each of two coils of the output terminal may be magnetically connected to a coil of the input terminal, one end of a first coil of the two coils may be connected to one end of the first diode, another end of the first coil may be connected to one end of a second coil of the two coils, and another coil of the second coil may be connected to the one end of the second diode, the other end of the first diode and another end of the second diode may be connected to one end of the third diode, the one end of the third diode may be connected to one end of the third inductor, another end of the third inductor may be connected to one end of the third capacitor, and another end of the third capacitor may be connected to another end of the third diode, and the third output terminal may be configured as both ends of the third capacitor.

Also, a first switching frequency and a first duty cycle of the first control signal may be determined based on constant voltage control to follow a predetermined ratio of a minimum output voltage value of the on-board charging device, and a second switching frequency and a second duty cycle of the second control signal may be determined based on constant voltage control to follow the predetermined ratio of the minimum output voltage value of the on-board charging device.

Also, a magnitude of a phase pulse of the second control signal may be determined to have a phase shift with a pulse of the first control signal based on a difference between a set output voltage value and the minimum output voltage value of the on-board charging device.

The technical solutions obtainable from the present disclosure are not limited to the aforementioned solutions and other solutions not described herein may be clearly understood by one of ordinary skill in the art from the following description.

According to some example embodiments, it is possible to provide a converting circuit for improving performance of an on-board charging device.

The effects obtainable from the present disclosure are not limited to the aforementioned effects and other effects not described herein may be clearly understood by one of ordinary skill in the art from the following description.

BRIEF DESCRIPTION OF THE FIGURES

Various aspects are described with reference to the accompanying drawings and, herein, like reference numerals refer to like elements throughout. In the following example embodiments, numerous specific details are set forth herein to provide thorough understanding of at least one aspect for the purpose of explanation. However, it will be apparent that such aspect(s) may be practiced without the specific details. In other examples, known structures and devices are illustrated in a form of a block diagram to easily describe at least one aspect:

FIG. 5A illustrates a converting circuit for an on-board charging device according to an example embodiment;

FIGS. 5C and 5D are graphs showing main waveforms according to a battery operation section of the converting circuit of FIG. 5A;

FIG. 6B illustrates a converting circuit for an on-board charging device according to another example embodiment.

DETAILED DESCRIPTION

Figure 1A:
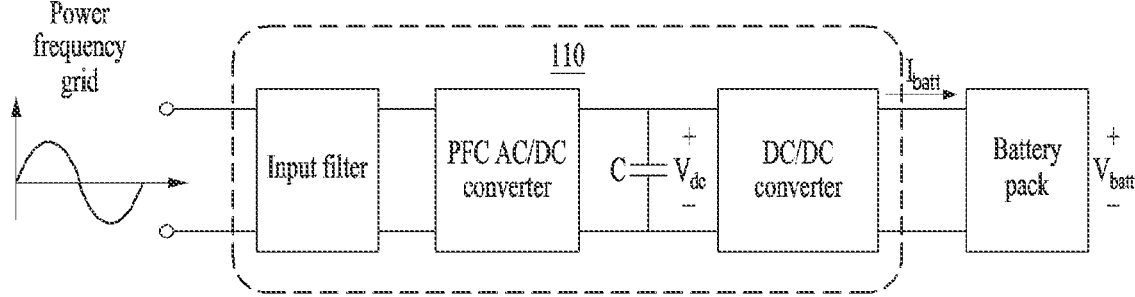
FIG. 1A (RELATED ART) is a diagram illustrating a structure of a battery charger used in an electric vehicle.

Various modifications and changes may be made to the present disclosure and the present disclosure may include various example embodiments. Specific example embodiments are described in detail with reference to the accompanying drawings. The example embodiments, however, may be embodied in various different forms, and should not be construed as being limited to only the specific example embodiments. Rather, the example embodiments should be understood to include all of the modifications, equivalents, and substitutions included in the spirit and technical scope of the present disclosure. Like reference numerals refer to like elements throughout to describe each drawing.

Although the terms "first," "second," "A," "B," etc., may be used herein to describe various components, the components should not be limited by these terms. These terms are only used to distinguish one component from another component. For example, a first component may also be termed a second component and, likewise, a second component may be termed a first component, without departing from the scope of this disclosure. As used herein, the term "and/or" includes any and all combinations of one or more of the associated items.

When a component is referred to as being "connected to" or "accessed to" another component, the component may be directly connected to or accessed to the other component, or one or more other intervening components may be present. In contrast, when a component is referred to as being "directly connected to" or "directly accessed to," there is no intervening component.

The terms used herein are used to simply explain specific example embodiments and are not construed to limit the present disclosure. The singular forms "a," "an," and "the," are intended to include the plural forms as well, unless the context clearly indicates otherwise. It will be further understood that the terms "comprises/comprising (incudes/including)," and "has/having" when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present disclosure belongs. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

FIG. 1A is a diagram illustrating a structure of a battery charger used in an electric vehicle.

Referring to FIG. 1A, the battery charger may generate direct current (DC) link voltage VDC through a power factor correction (PFC) alternating current (AC)/DC converter in an AC system. The generated DC link voltage VDC is input to a DC/DC converter 110 to generate a DC voltage or current required for charging according to a charging mode of a battery pack. Detailed description is made with a current and voltage graph over a charging time of a battery pack of FIG. 1B.

Figure 1B:
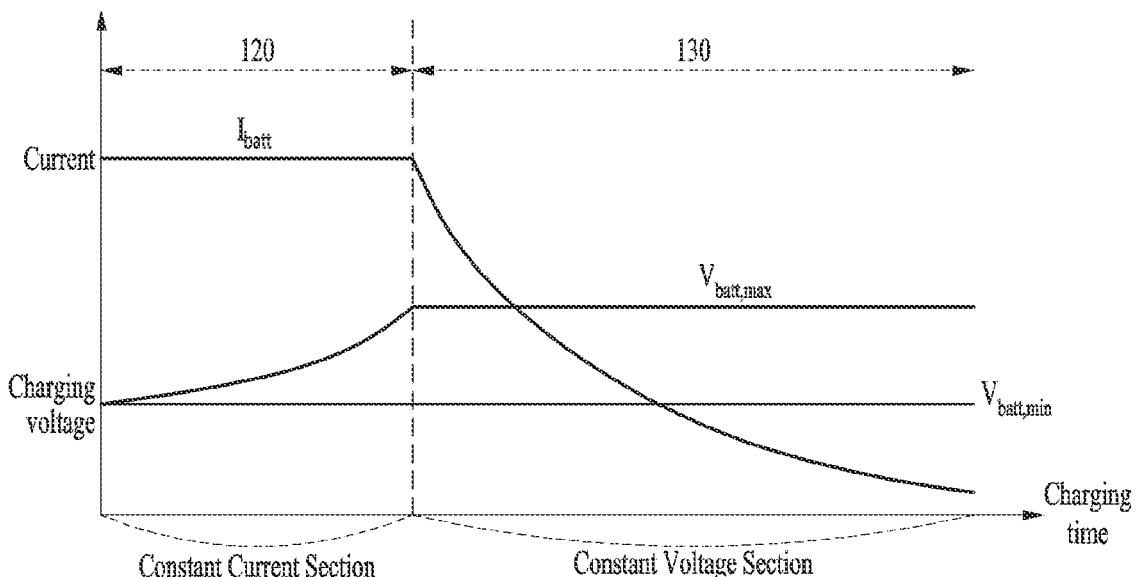
FIG. 1B (RELATED ART) is a current and voltage graph over a charging time of a battery pack according to an example embodiment.

FIG. 1B is a current and voltage graph over a charging time of a battery pack according to an example embodiment.

Referring to FIG. 1B, depending on a capacity of a battery, the battery reaches a maximum voltage $V_{batt.max}$ when the battery is fully charged, and the battery reaches a minimum voltage $V_{batt.min}$ when the battery is fully discharged. According to an operating mode, in a charging section 120, the discharged battery is charged with constant DC $I_{batt}$ for safety according to its specifications and a battery charging voltage increases from the minimum voltage $V_{batt.min}$ Over time. In the above charging section 120, the DC/DC converter 110 needs to be constant current controlled to output constant DC $I_{batt}$ using the DC link voltage VDC.

In a discharging section 130 in which the battery is fully charged and starts discharging, the DC/DC converter 110 needs to be at a constant voltage such that its output voltage becomes the maximum voltage $V_{batt.max}$ of the battery. As described above, a method of controlling the DC/DC converter 110 to output constant DC when charging the battery and to output a constant DC voltage when charging is completed according to an operation section, for example, the charging section 120 and the discharging section 130, is referred to as a constant current constant voltage (CCCV) control method of the DC/DC converter, which is a common control method used when charging the battery.

As an example embodiment, when specifications of a target battery include $V_{batt.min}$=250V, $V_{batt.max}$=400V, and charging current $I_{batt}$=16.5A, a battery voltage linearly increases from 250V over time, and the charging current is constant at 16.5A until the battery voltage reaches 400V. For reference, a constant current controlled charging section may vary depending on a battery capacity or an initial battery voltage condition, but usually uses about 2 to 12 hours. When the battery voltage reaches 400V, the DC/DC converter 110 outputs a preset voltage 400V and battery charging current decreases over time and reaches OA. As described above, a constant voltage controlled discharging section may vary depending on battery specifications, but usually uses about 1 to 30 minutes. In the charging section 120 of FIG. 1B, the DC/DC converter 110 is constant current controlled and an output voltage $V_O$ operates in a wide range that varies from 250V to 400V based on the above example embodiment. Also, the output current of the DC/DC converter 110 is maintained at a constant level of 16.5A based on the above example embodiment and here, according to an increase in the output voltage $V_O$, power throughput also operates from 4.125 kW to 6.6 Kw. However, as shown in the current and voltage graph of FIG. 1B, even a DC/DC converter of up to 6.6 Kw operates under a light load condition within most of the charging section 120.

Figure 2A:
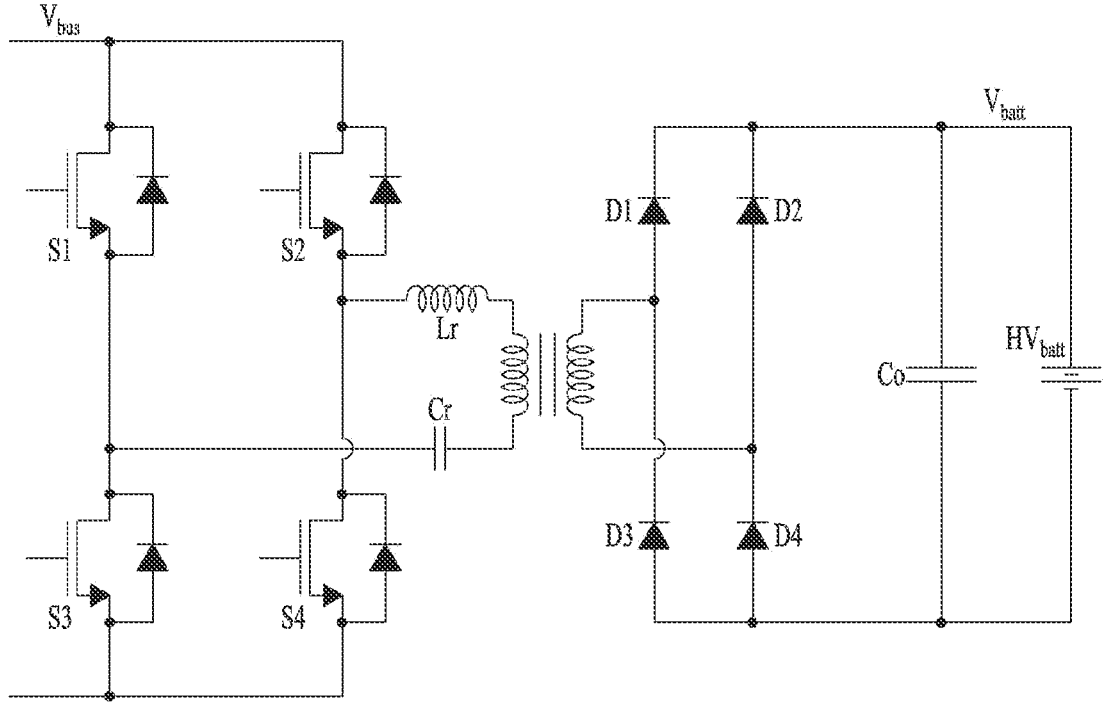
FIG. 2A (RELATED ART) is a circuit diagram illustrating a conventional inductor-inductor-capacitor (LLC) resonant converter.

FIG. 2A is a circuit diagram illustrating a conventional inductor-inductor-capacitor (LLC) resonant converter.

Since each component of the conventional LLC resonant converter is straightforward to one of ordinary skill in the art, description related to a configuration and an operating principle thereof is omitted. A turn-on and turn-off operation of a switch included in an LLC resonant converter is repeated according to a preset switching cycle $T_S$. Typically, a pulse frequency modulation (PFM) control method for adjusting a switching frequency $f_{sw}(=1/T_S)$ for controlling an output voltage and current while a duty cycle (duty cycle=conduction time/period, duty ratio) is fixed to 0.5 is widely used.

Figure 2B:
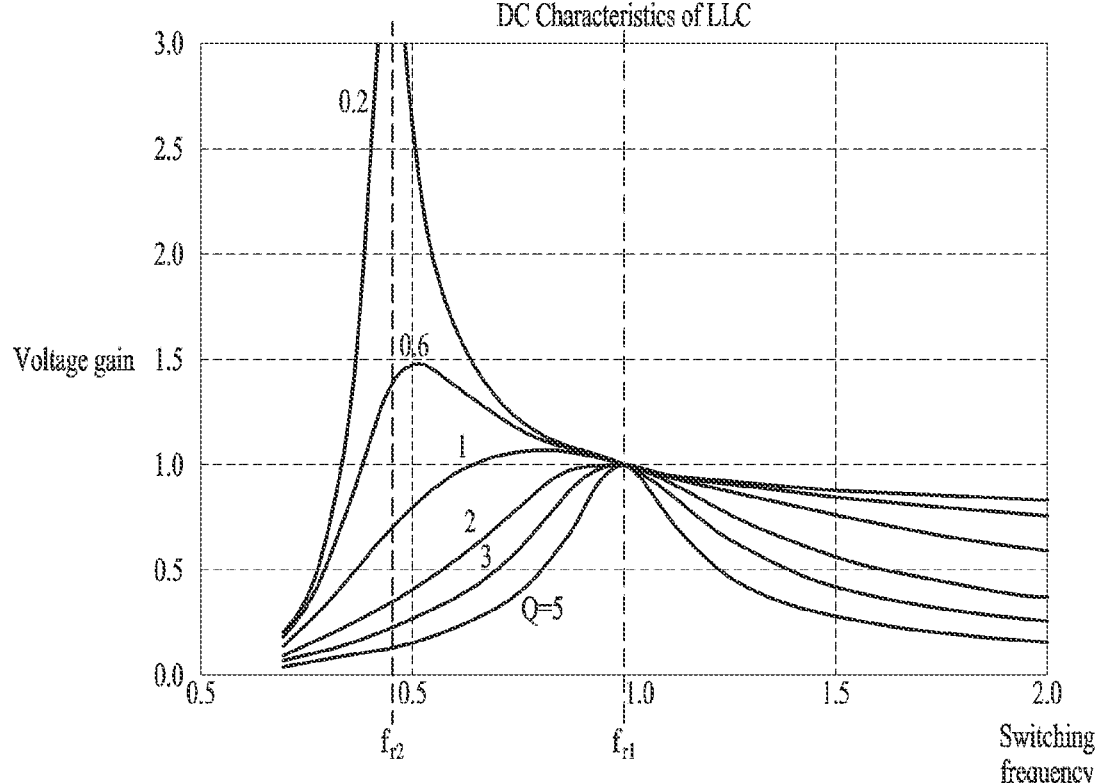
FIG. 2B (RELATED ART) is a graph showing an example of a voltage gain according to a change in a switching frequency of a conventional LLC converter.

FIG. 2B is a graph showing an example of a voltage gain according to a change in a switching frequency of a conventional LLC converter.

The aforementioned LLC converter has an advantage of having a lower switching loss and a higher power conversion efficiency by supporting zero voltage switching, but has a difficulty in implementing a control for an optimal operation due to a wide switching frequency range according to an operating section defined by a first resonant frequency $f_{r1}$ and a second resonant frequency $f_{r2}$ representing maximum power gain when operating in a wide output voltage range. That is, the conventional LLC converter has an issue, such as a lower power conversion efficiency under a light load condition and a wide output voltage fluctuation condition, such as a battery charging section.

Figure 3A:
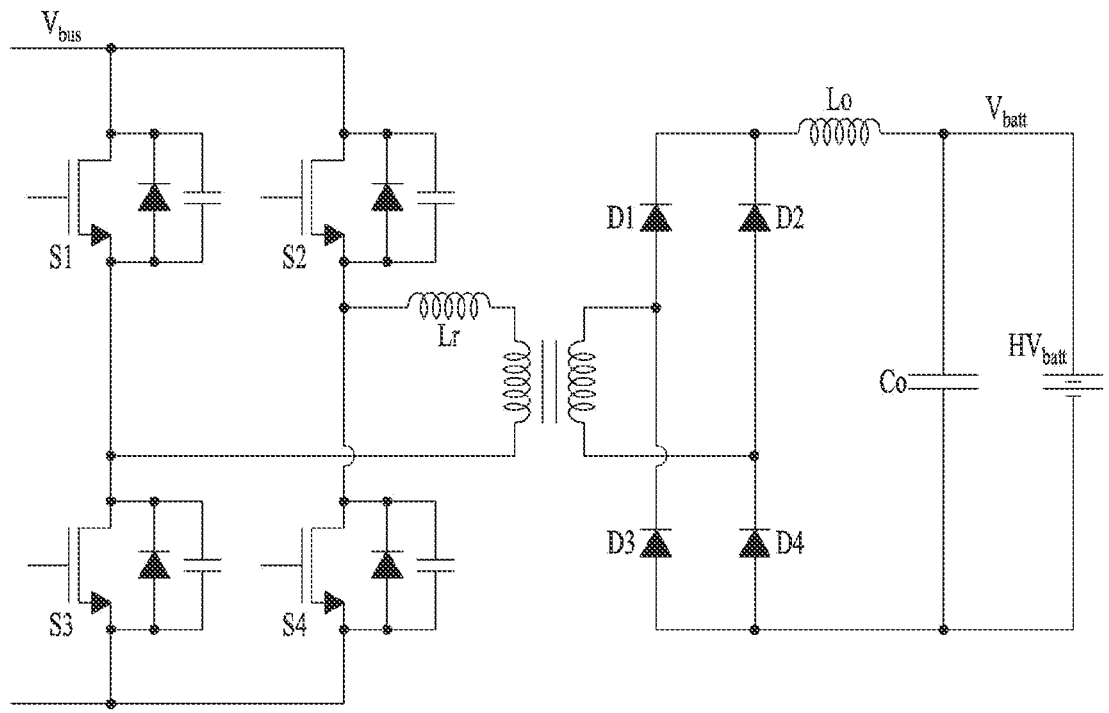
FIG. 3A (RELATED ART) is a circuit diagram illustrating a conventional phase shift full-bridge converter.

FIG. 3A is a circuit diagram illustrating a conventional phase shift full-bridge converter.

Since each component of the conventional phase shift full-bridge converter is straightforward to one of ordinary skill in the art, description related to a configuration and an operating principle thereof is omitted. The phase shift full-bridge converter employs, for control, a pulse width modulation (PWM) method for repeating with a switching cycle $T_S$ for controlling turn-on and turn-off of a switch and adjusting a phase shift between switch legs (e.g., $S_1$, $S_2$ and $S_3$, $S_4$) with a fixed duty cycle.

Figure 3B:
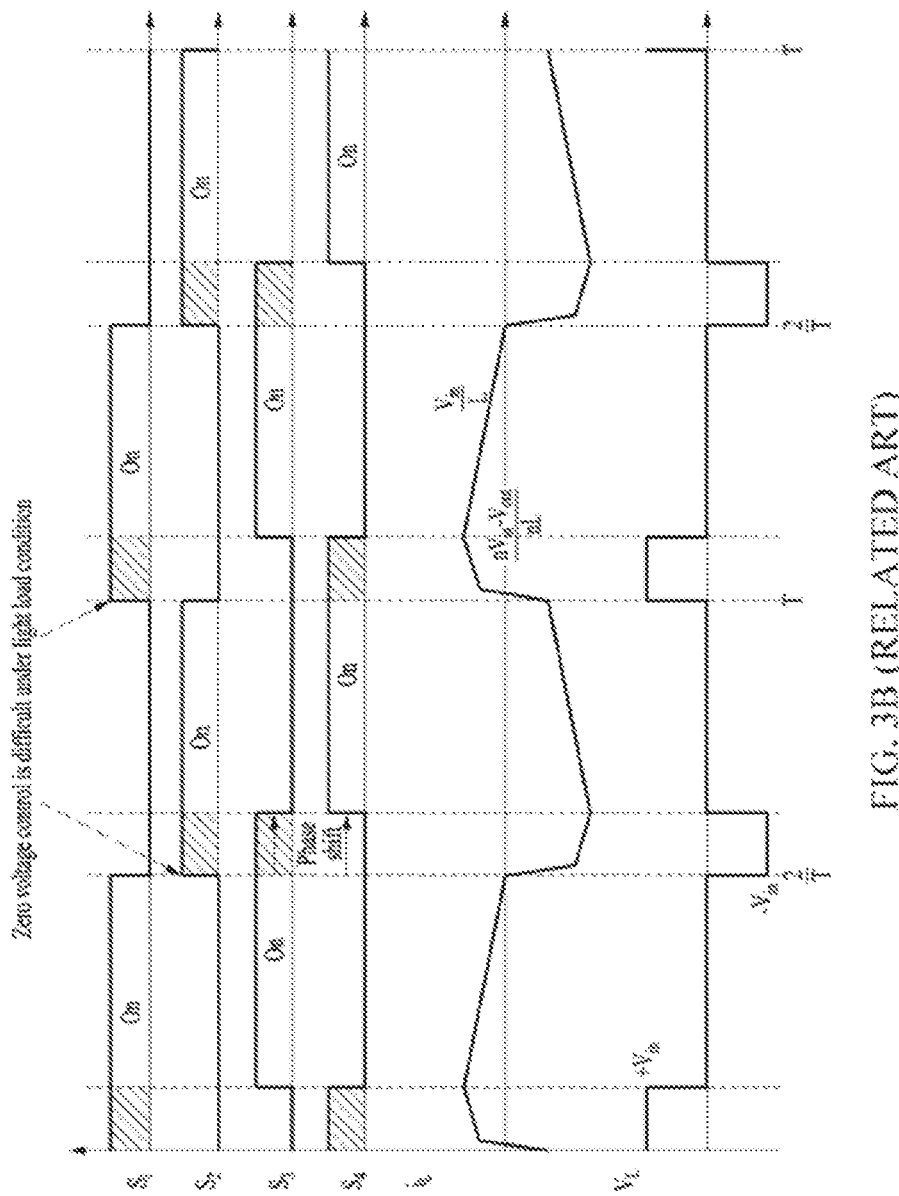
FIG. 3B (RELATED ART) is a graph showing an example of main waveforms for controlling a conventional phase shift full-bridge converter.

FIG. 3B is a graph showing an example of main waveforms for controlling a conventional phase shift full-bridge converter.

Referring to FIG. 3B, a first transistor $S_1$ and a second transistor $S_2$ are alternately turned on and off according to a switching signal, and a third transistor $S_3$ and a fourth transistor $S_4$ are alternately turned on and off according to the switching signal. Also, each of switching signals that are transmitted to a first switch leg including the first transistor $S_1$ and the second transistor $S_2$ and a second switch leg including the third transistor $S_3$ and the fourth transistor $S_4$ is controlled to have a preset phase shift. The phase shift full-bridge converter has a low switching loss through a zero-voltage operation, resulting in a high power conversion efficiency. Even when operating in a wide output voltage range, a switching frequency is fixed, making it easy to implement an optimal control. However, under the light load condition that is mainly used in a battery charger, a zero-voltage operating condition of one switch leg is broken, which leads to hard switching and switching loss. Similar to the aforementioned LLC converter, in a battery charging application, there is an issue of a low power conversion efficiency according to the light load condition and wide output voltage fluctuation.

Figure 4A:
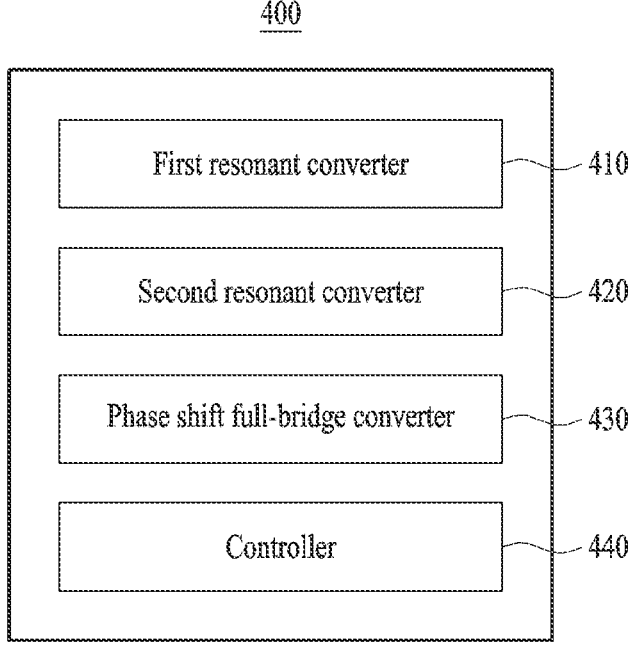
FIG. 4A is a block diagram illustrating a converting circuit according to an example embodiment.

FIG. 4A is a block diagram illustrating a converting circuit according to an example embodiment.

Referring to FIG. 4A, a converting circuit 400 may include a first resonant converter 410, a second resonant converter 420, a phase shift full-bridge converter 430, and a controller 440. The first resonant converter 410 may include at least two first switching elements. The first resonant converter 410 may output a first output voltage under constant voltage control to follow a predetermined ratio of a minimum voltage of a battery connected to an output terminal according to a first control signal that is input to the at least two first switching elements. In detail, if a minimum output voltage of a target battery is 250V, the first output voltage may be set to 125V that is 50% of the minimum output voltage. In this case, as an output voltage of the first resonant converter 410 is controlled to follow 125V, a switching frequency for turning on or turning off the at least two first switching elements may be fixed and the effect of resolving a difficulty in performing an optimal control according to a change in the switching frequency may be expected.

The second resonant converter 420 may include at least two second switching elements. Similar to the first resonant converter 410, the second resonant converter 420 may output a second output voltage under constant voltage control to follow the predetermined ratio of the minimum voltage of the battery connected to the output terminal according to a second control signal that is input to the at least two second switching elements. For example, but without being limited, the predetermined ratio may be set to be the same for each of the first resonant converter 410 and the second resonant converter 420. For example, if the minimum output voltage of the target battery is 250V, the first output voltage may be set to 125V that is 50% of the minimum output voltage. Even in this case, as the output voltage of the second resonant converter 420 is controlled to follow 125V, a switching frequency for turning on or turning off the at least two second switching elements may be fixed and the effect of resolving a difficulty in performing an optimal control according to a change in the switching frequency may be expected.

The phase shift full-bridge converter 430 may transmit, to an output terminal, at least a portion of a DC voltage that is transmitted from an input terminal due to a phase shift between the first control signal and the second control signal generated according to an operating mode of the battery. An operation of the phase shift full-bridge converter 430 will be further described with reference to the additional drawings.

The controller 440 may generate each of a first control signal and a second control signal each of which a switching frequency is determined to follow the predetermined ratio of the minimum voltage of the battery and may transmit the same to the switching elements included in the first resonant converter 410 and the second resonant converter 420. Also, the controller 440 may generate a pulse of generating a phase shift between the first control signal and the second control signal for constant current control that follows a reference current value set to correspond to a charging and discharging section of the battery or for constant voltage control that follows a difference value between a maximum voltage and a minimum voltage of the battery and may transmit the first control signal and the second control signal with the generated phase shift according to the pulse to switching elements included in the first resonant converter 410 and the second resonant converter 420, respectively.

Figure 4B:
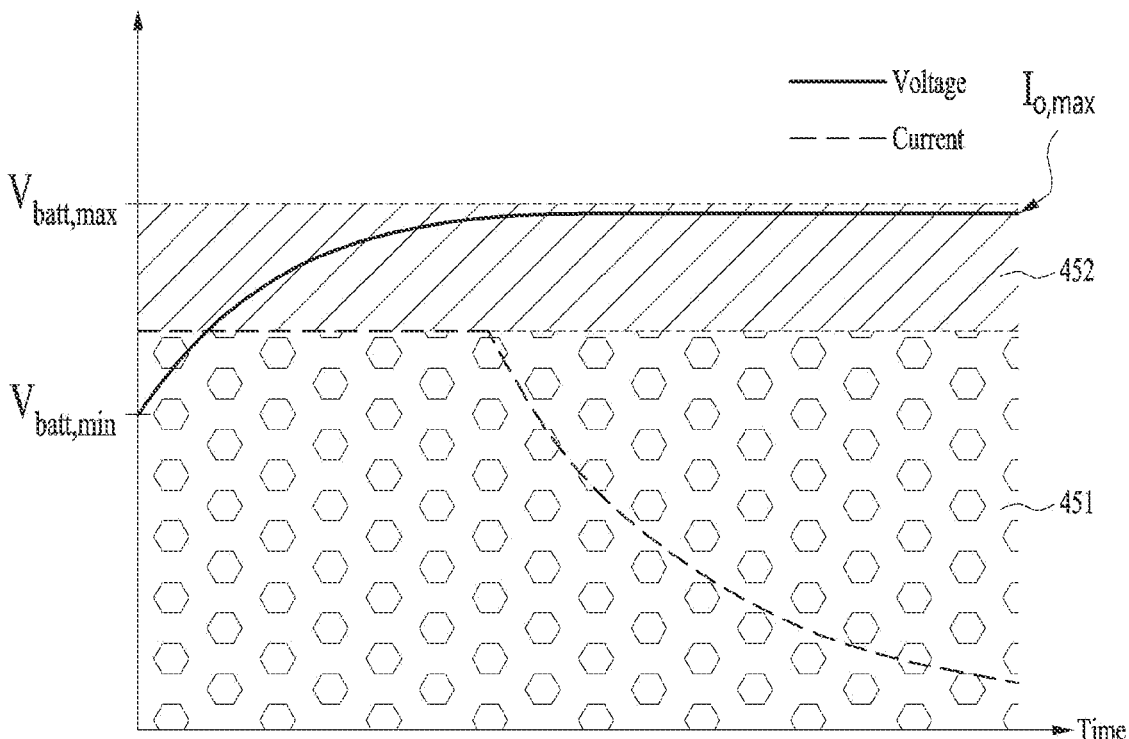
FIG. 4B is a power processing profile graph according to a battery operation section of the converting circuit of FIG. 4A.

FIG. 4B is a power processing profile graph according to a battery operation section of the converting circuit of FIG. 4A.

An output voltage corresponding to a first power section 451 may be provided to a battery by an output voltage of the first resonant converter 410 and the second resonant converter 420. In detail, since each of the first and second resonant converters 410 and 420 is constant voltage controlled at the switching frequency fixed to output the predetermined ratio of the minimum voltage $V_{batt,min}$ of the battery, the effect of correcting a zero voltage control and removing an inefficiency, such as current stress by wide voltage range control, may be expected.

Additionally, according to an operating section of the battery, an output voltage and output current corresponding to a second power section 452 may be provided to output of the phase shift full-bridge converter 430. In a discharging section of the battery, the phase shift full-bridge converter 430 is constant voltage controlled to follow a difference between the maximum voltage $V_{batt,max}$ of the battery and the minimum voltage $V_{batt,min}$ of the battery and thus, the output voltage may be controlled to be low and a voltage stress of a secondary output terminal may decrease. Also, in a charging section of the battery, the phase shift full-bridge converter 430 may be constant current controlled to follow maximum tolerance current $I_{o,max}$ of the battery and the effect of ensuring a zero-voltage switching condition even under a light load condition with magnetization current of a resonant converter may be expected.

Figure 5A:
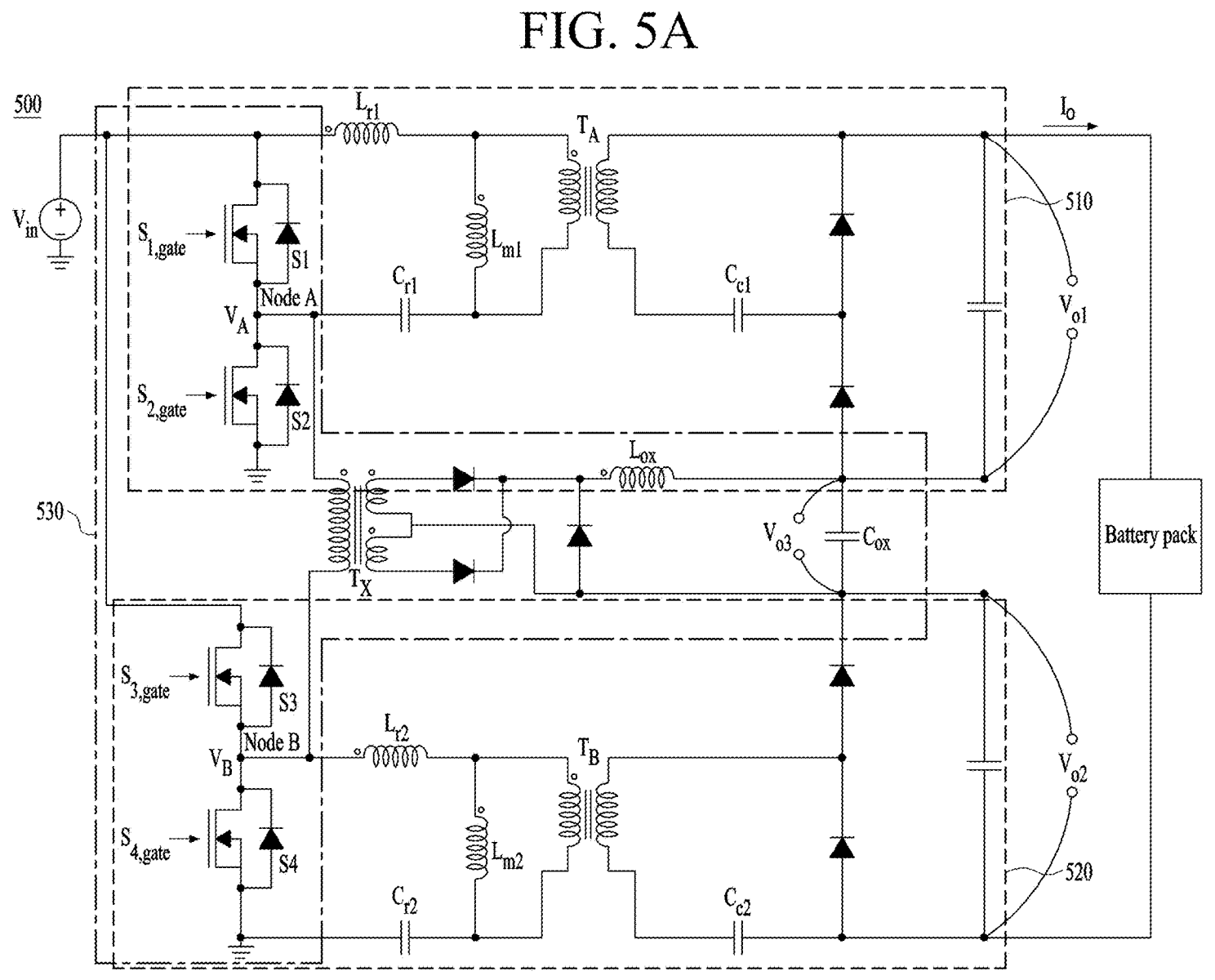

FIG. 5A illustrates a converting circuit for an on-board charging device according to an example embodiment.

Referring to FIG. 5A, a converting circuit 500 may include a first resonant converter 510, a second resonant converter 520, a phase shift full-bridge converter 530, and at least one output terminal. However, the aforementioned components are not necessarily required to implement the converting circuit 500 and the converting circuit 500 may include more or fewer components than the components listed above.

The first resonant converter 510 may include at least two first switching elements $S_1$ and $S_2$, and a first transformer TA. Here, the resonant converter may be a device configured to control an output voltage using a change in a frequency. The first resonant converter 510 may be constant voltage controlled such that an output voltage output to a first output terminal $V_{O1}$ may follow a predetermined ratio of a minimum voltage corresponding to specifications of a battery pack. A first control signal described below represents a control signal of which a switching frequency is determined to follow the predetermined ratio of the minimum voltage.

For example, the first resonant converter 510 may be implemented in a form of a half-bridge resonant converter.

The first resonant converter 510 may be connected to an input voltage $V_{in}$. The first resonant converter 510 may transmit at least a portion of a DC voltage transmitted from the input voltage $V_{in}$ to the first output terminal $V_{O1}$ through the first transformer TA according to the first control signal that is input to the at least two first switching elements $S_1$ and $S_2$.

The at least two first switching elements $S_1$ and $S_2$ may control an operating mode of the first resonant converter 510 through on-off switching of an electrical signal. Each of the at least two first switching elements $S_1$ and $S_2$ may be a transistor that includes a gate node, a drain node, and a source node.

The first transformer TA may serve to insulate and convert a voltage between an input and an output. The first transformer TA may transmit at least a portion of a DC voltage that is transmitted from an input terminal to the first output terminal $V_{O1}$ according to the first control signal that is input to the at least two first switching elements $S_1$ and $S_2$.

The second resonant converter 520 may include at least two second switching elements $S_3$ and $S_4$ and a second transformer $T_B$. The second resonant converter 520 may be constant voltage controlled such that an output voltage output through a second output terminal $V_{O2}$ may follow the predetermined ratio of the minimum voltage corresponding to specifications of the battery pack. A second control signal described below also represents a control signal of which a switching frequency is determined to follow the predetermined ratio of the minimum voltage.

According to an example embodiment, the second resonant converter 520 may be implemented in a form of a half-bridge resonant converter.

The second resonant converter 520 may be connected in parallel to the first resonant converter 510 for the input voltage $V_{in}$. It is only an example of implementation to help understanding and an example embodiment in which the first resonant converter 510 and the second resonant converter 520 are connected in series based on the input terminal may be included within the scope of the technical spirit of the present disclosure.

The second resonant converter 520 may transmit at least a portion of the input voltage $V_{in}$ to the second output terminal $V_{O2}$ through the second transformer $T_B$ according to the second control signal that is input to the at least two second switching elements $S_3$ and $S_4$.

The at least two second switching elements $S_3$ and $S_4$ may control an operating mode of the second resonant converter 520 through on-off switching of an electrical signal. Each of the at least two second switching elements $S_3$ and $S_4$ may be a transistor that includes a gate node, a drain node, and a source node.

The second transformer $T_B$ may serve to insulate and convert a voltage between an input and an output. The second transformer $T_B$ may transmit at least a portion of the DC voltage that is transmitted from the input terminal to the second output terminal $V_{O2}$ according to the second control signal that is input to the at least two second switching elements $S_3$ and $S_4$.

The conventional converting circuit needs to be controlled to output the entire range (e.g., 250V to 400V) according to voltage specifications. On the other hand, each of the first resonant converter 510 and the second resonant converter 520 according to the present disclosure may be constant voltage controlled to fixedly output a voltage corresponding to the predetermined ratio of the minimum voltage of the battery. Therefore, a voltage output from the first resonant converter 510 and the second resonant converter 520 may satisfy the minimum voltage (e.g., 250V) of the battery and may satisfy a minimum condition according to voltage specifications. Further, since operating modes of the first resonant converter 510 and the second resonant converter 520 are fixedly controlled, LOSS under a boundary condition may not occur.

The phase shift full-bridge converter 530 may include a third transformer $T_X$. The phase shift full-bridge converter 530 may perform converting through a phase shift control method. The phase shift full-bridge converter 530 may transmit at least a portion of the input voltage $V_{in}$ to a third output terminal $V_{O3}$ through the third transformer $T_X$ according to the phase shift between the first control signal and second control signal and a turns ratio between an input terminal and an output terminal of the third transformer $T_X$. The phase shift full-bridge converter 530 may connect a node A in which a source terminal of a (1-1)-th switching element $S_1$ and a drain terminal of a (1-2)-th switching element $S_2$ of the first resonant converter 510 are connected to one end of the input terminal. Also, the phase shift full-bridge converter 530 may connect a node B in which a source terminal of a (2-1)-th switching element $S_3$ and a drain terminal of a (2-2)-th switching element $S_4$ of the second resonant converter 520 are connected to another end of the input terminal.

According to an example embodiment, a voltage value at the third output terminal $V_{O3}$ may be determined based on the following Equation 1.

$$V_{o3} = V_{in} \times \left( \frac{\text{phase shift}}{180} \right) \times n3 \qquad \text{[Equation 1]}$$

In Equation 1, $V_{o3}$ denotes a voltage value at the third output terminal and $V_{in}$ denotes a voltage value of the DC voltage transmitted from the input terminal.

$$\frac{\text{phase} - \text{shift}}{180}$$

denotes the phase shift between the first control signal and the second control signal, and n3 denotes the turns ratio of the third transformer $T_X$.

The phase shift full-bridge converter 530 may be turned on according to a phase shift between the first resonant converter 510 and the second resonant converter 520. The phase shift full-bridge converter 530 may output a voltage of 0 to 150V according to output settings. Therefore, the total range of voltage output from the converting circuit 500 refers to 250 to 400V and may satisfy the minimum condition and the maximum condition according to voltage specifications. Also, the phase shift full-bridge converter 530 may be turned on or turned off according to the phase shift between the first resonant converter 510 and the second resonant converter 520 and thus, may be controlled independent of a boundary condition of a transistor. That is, although the phase shift full-bridge converter 530 is present, the converting circuit 500 may not generate LOSS under the boundary condition.

Meanwhile, according to some example embodiments, a first duty cycle of a first control signal may be determined based on constant voltage control to follow a predetermined ratio of a minimum output voltage value of an on-board charging device. A second duty cycle of a second control signal may be determined based on constant voltage control to follow the predetermined ratio of the minimum output voltage value of the on-board charging device. Hereinafter, description related to the first control signal and the second control signal is made with reference to FIGS. 5C and 5D.

Hereinafter, a controller of the converting circuit 500 according to the present disclosure is described with reference to FIG. 5B.

Figure 5B:
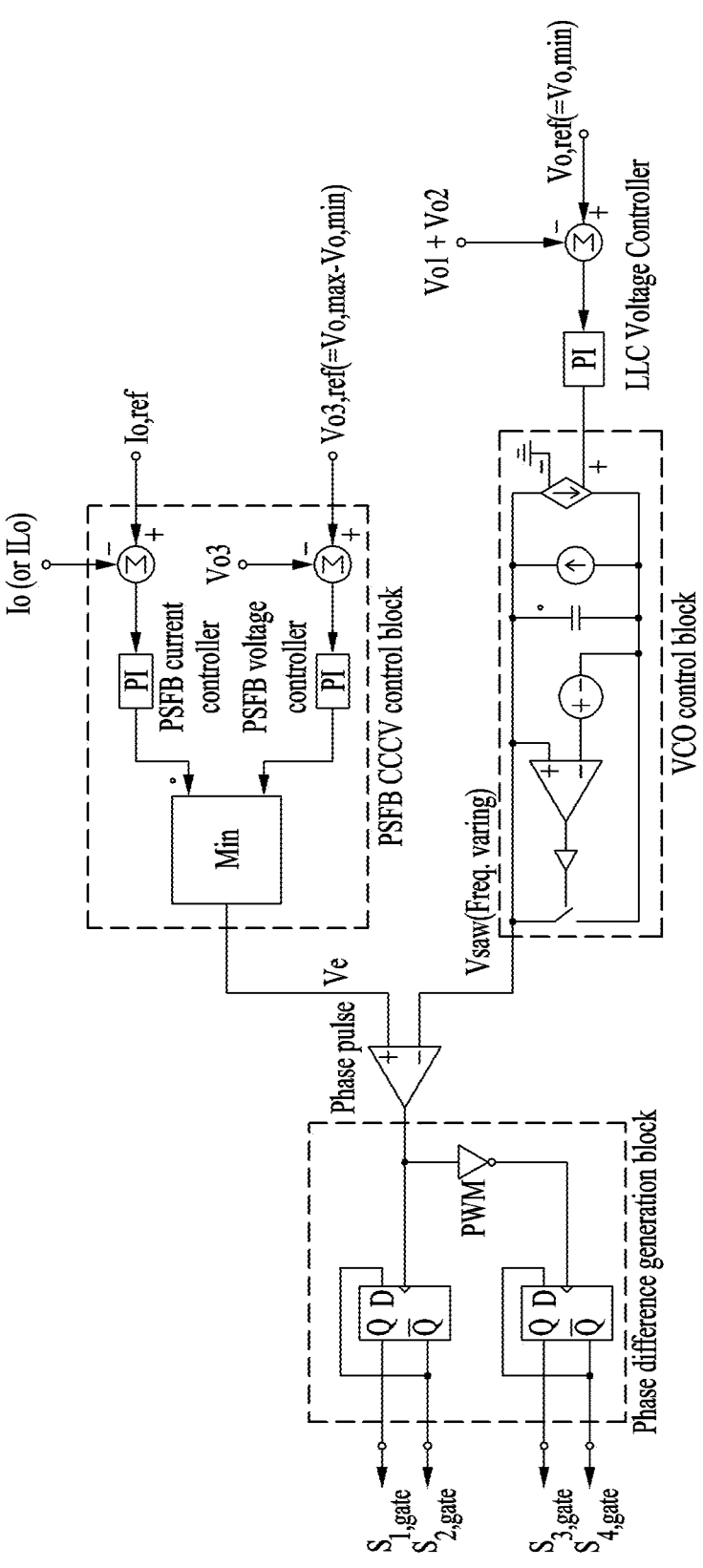
FIG. 5B is a circuit diagram illustrating a controller of a converting circuit according to an example embodiment.

FIG. 5B is a circuit diagram illustrating a controller of a converting circuit according to an example embodiment.

Referring to FIG. 5B, the controller of the converting circuit 500 may perform a series of control scenarios through a phase shift generation block, a phase shift full bridge (PSFB) CCCV control block, and a voltage controlled oscillator (VCO) block.

According to an example embodiment, the first resonant converter 510 of the converting circuit 500 may operate according to a first control signal that is input to at least two first switching elements $S_1$ and $S_2$.

A first duty cycle of the first control signal may be determined based on constant voltage control to follow a predetermined ratio of a minimum output voltage value of an on-board charging device. The minimum output voltage value may be, for example, 250V. A duty cycle is a numerical value expressing, as a percentage, a ratio of a time duration in which a signal is turned on in one cycle of the signal that is turned on and turned off. Additionally, a switching frequency corresponding to a time interval of pulses that turn on and turn off the first resonant converter 510 within the first control signal may be implemented as a fixed value according to constant voltage control.

Also, the second resonant converter 520 of the converting circuit 500 may operate according to a second control signal that is input to at least two second switching elements $S_3$ and $S_4$.

A second duty cycle of the second control signal may be determined based on constant voltage control to follow the predetermined ratio of the minimum output voltage value of the on-board charging device. Likewise, even in the case of using a PFM, the second resonant converter 520 is constant voltage controlled and thus, a switching frequency corresponding to a time interval of pulses that turn on and turn off the second resonant converter 520 within the second control signal may be implemented as a fixed vale according to constant voltage control.

Depending on example embodiments, the first duty cycle of the first control signal may be determined based on constant voltage control such that the first output terminal may output 125V that is 50% of the minimum output voltage value. The second duty cycle of the second control signal may be determined based on constant voltage control such that the second output terminal may output 125V that is 50% of the minimum output voltage value.

A magnitude of a pulse of the second control signal may be determined to have a phase shift with a pulse of the first control signal.

In detail, a magnitude of a phase pulse of the second control signal may be determined to have the phase shift with the pulse of the first control signal based on a difference between a set output voltage value and the minimum output voltage value of the on-board charging device.

According to the aforementioned description, the first resonant converter 510 and the second resonant converter 520 may be constant voltage controlled such that an output voltage may follow a fixed value. Therefore, a wide range operation of the first resonant converter 510 and the second resonant converter 520 may not be required. Also, a zero voltage switch (ZVS) and a zero current switch (ZCS) operation of the first resonant converter 510 and the second resonant converter 520 may be ensured and may operate such that current stress may be minimized. Therefore, the charging efficiency performed by the converting circuit 500 may be maximized.

Also, the phase shift full-bridge converter 530 may perform CCCV control. Since an operation performed through the phase shift full-bridge converter 530 has a low output voltage, stress on a secondary voltage may be low. In detail, the PSFB CCCV control block may perform constant current control such that output current of the converting circuit 500 follows $I_{o,max}$ corresponding to specifications of the battery or may perform constant voltage control such that an output voltage of the phase shift full-bridge converter 530 may follow a difference value between a maximum voltage and a minimum voltage of the battery, according to a charging mode or a discharging mode of the battery. In detail, the PSFB CCCV control block may determine $V_e$ using a minimum value between an output of a PSFB current controller and an output of a PSFB voltage controller. To select a minimum value between two outputs is to select a control mode according to a dominant control factor between the constant current control and the constant voltage control. In detail, $V_e$ denotes a reference voltage size for performing a pulse width modulation (PWM) through a size comparison with sawtooth wave $V_{SAW}$. According to computation results for the PWM control, the phase shift generation block may generate a pulse of generating a phase shift between the first control signal and the second control signal. Also, the phase shift generation block may input the first control signal with the added pulse for the phase shift to a gate terminal of the first switching elements $S_1$ and the second switching elements $S_2$ and may input the second control signal with the added pulse for the phase shift to a gate terminal of the third switching elements $S_3$ and the fourth switching elements $S_4$.

Figure 5C:
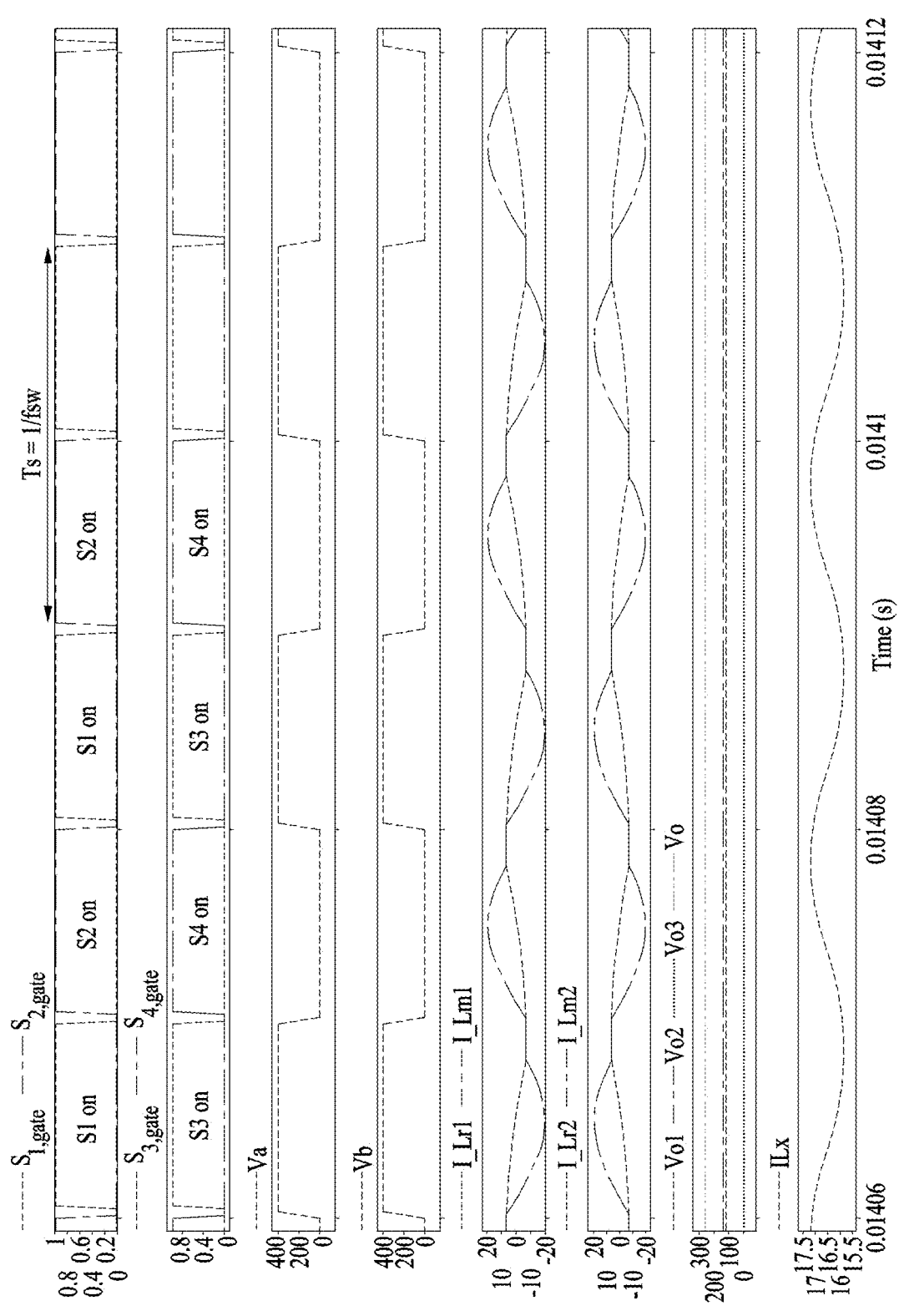
Figure 5D:
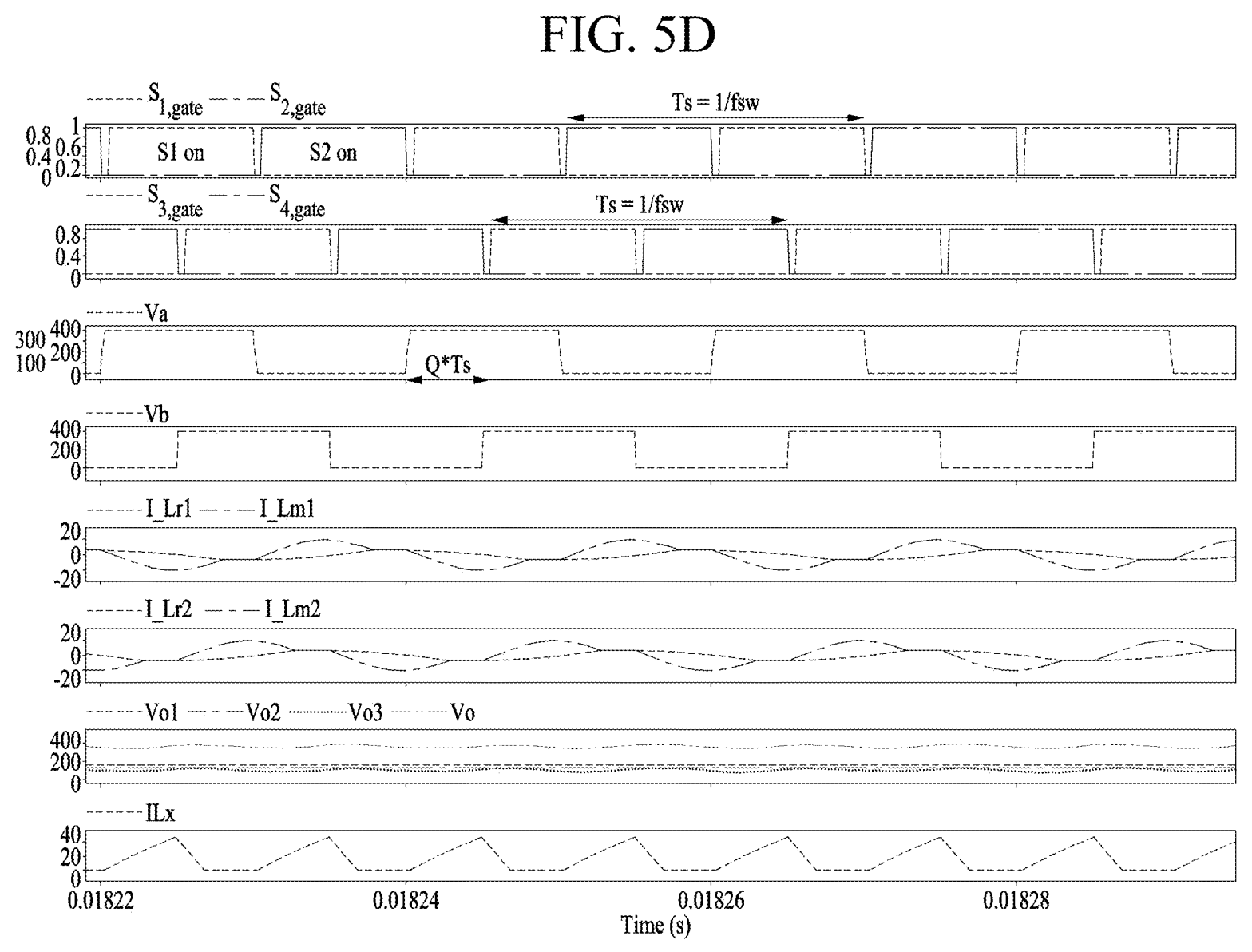
Figure 5E:
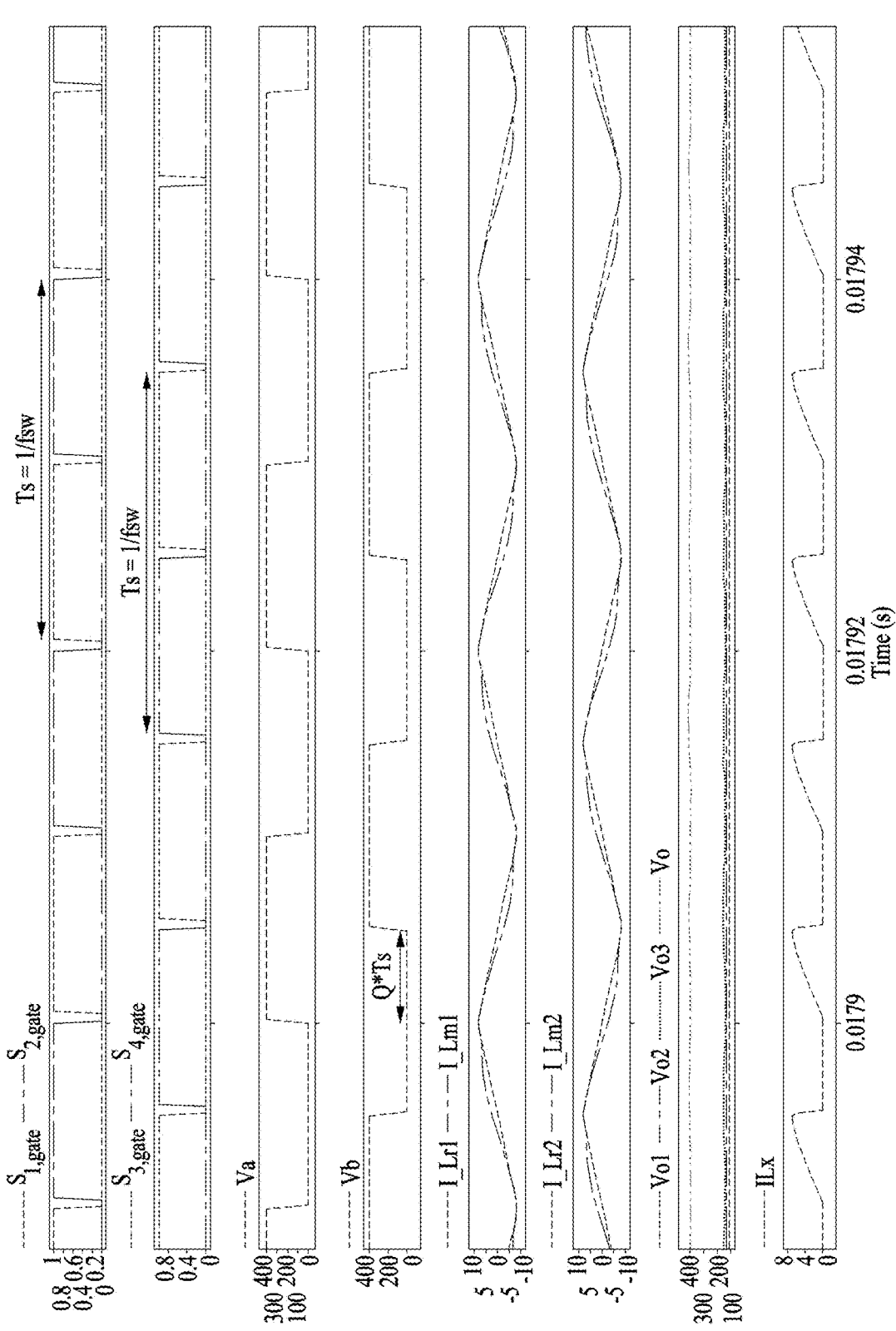
FIG. 5E is a graph showing an example of a section in which a battery is fully charged and discharged.

FIGS. 5C to 5E are graphs showing main waveforms according to a battery operation section of the converting circuit of FIG. 5A. As an example, a case in which a minimum voltage of a battery connected to the converting circuit 500 is 250V, a maximum voltage is 400V, and rated current $I_{DC}$ is 16.5A is described.

FIG. 5C illustrates an initial charging section of a battery in which a voltage $V_{batt}$ at both ends of the battery is 250V. A first switching elements $S_1$ and a second switching elements $S_2$ may receive a first control signal of which a duty cycle and a switching frequency are determined in response to a preset voltage (e.g., 130V) size and a first control signal of which a turn-on section and a turn-off section are alternately repeated. Likewise, a third switching elements $S_3$ and a fourth switching elements $S_4$ may receive a second control signal of which a duty cycle (e.g., 50%) and a switching frequency (e.g., 50 kHz) are determined in response to a preset voltage (e.g., 130V) size and a second control signal of which a turn-on section and a turn-off section are alternately repeated. However, in this case, since an output voltage or output current to be additionally provided from a phase shift full-bridge converter is absent, the phase shift between the first control signal and the second control signal is set to zero degrees and the phase shift full-bridge converter is maintained turned off.

FIG. 5D is a graph showing an example of a section in which charging of a battery is completed. Compared to FIG. 5C, the phase shift between the first control signal and the second control signal is set to 90 degrees and the phase shift full-bridge converter provides an output voltage of about 145V. However, even when the voltage $V_{batt}$ at both ends of the battery increases, switching frequencies of two resonant converters remain fixed and $I_{Lr1}$ and $I_{Lr2}$ are fixed, so the effect of reducing current stress may be expressed.

FIG. 5E is a graph shown an example of a section in which a battery is fully charged and discharged. Compared to FIG. 5C, the phase shift between the first control signal and the second control signal is set to 180 degrees and the phase shift full-bridge converter provides an output voltage of about 145V.

Figure 6A:
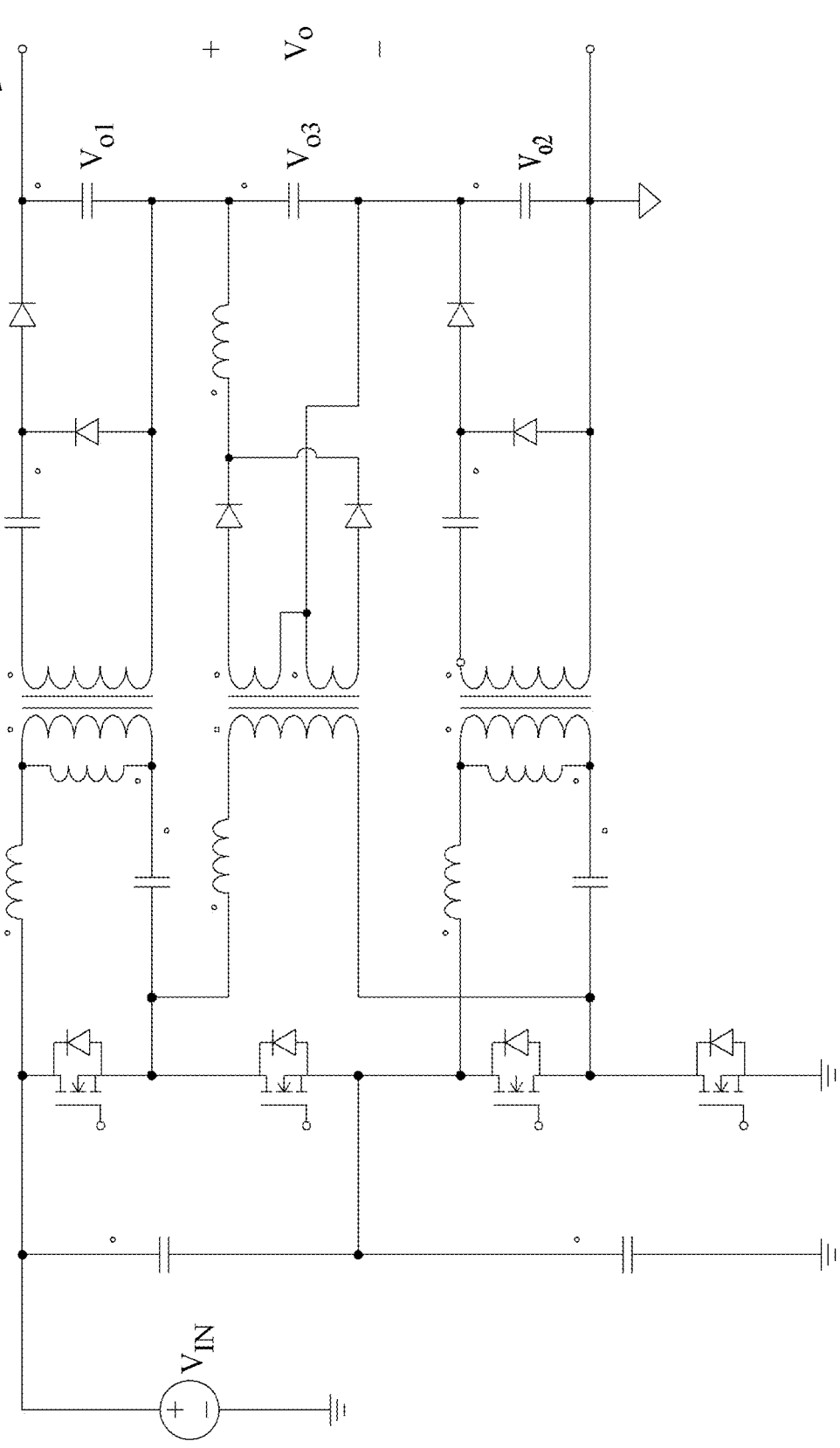
FIG. 6A illustrates a converting circuit for an on-board charging device according to another example embodiment.

FIG. 6A illustrates a converting circuit for an on-board charging device according to another example embodiment.

Referring to FIG. 6A, the converting circuit for the on-board charging device according to another example embodiment may include a first resonant converter, a second resonant converter, a phase shift full-bridge converter, and at least one output terminal.

The first resonant converter may include at least two first switching elements and a first transformer. The first resonant converter may be constant voltage controlled such that an output voltage output from a first output terminal $V_{O1}$ may follow a predetermined ratio of a minimum voltage corresponding to specifications of a battery pack. The first resonant converter may be connected to an input voltage $V_{in}$. The first resonant converter may transmit at least a portion of a DC voltage that is transmitted from the input voltage $V_{in}$ to the first output terminal $V_{O1}$ through the first transformer according to a first control signal that is input to the at least two first switching elements. The first control signal represents a control signal of which a switching frequency is determined to follow the predetermined ratio of the minimum voltage.

The second resonant converter may include at least two second switching elements and a second transformer. The second resonant converter may be constant voltage controlled such that an output voltage output through a second output terminal $V_{O2}$ may follow the predetermined ratio of the minimum voltage corresponding to specifications of the battery pack. The second resonant converter may transmit at least a portion of the input voltage $V_{in}$ to a second output terminal $V_{O2}$ through the second transformer according to a second control signal that is input to the at least two second switching elements. The second control signal represents a control signal of which a switching frequency is determined to follow the predetermined ratio of the minimum voltage.

The phase shift full-bridge converter may include a third transformer. The phase shift full-bridge converter may transmit at least a portion of the input voltage $V_{in}$ to a third output terminal $V_{O3}$ through the third transformer according to a phase shift between the first control signal and the second control signal and a turns ratio of an input terminal and an output terminal of the third transformer.

Compared to FIG. 5A, the first resonant converter and the second resonant converter may be connected in series based on the input terminal. The first resonant converter may be connected in series to the output terminal $V_{O1}$, and the second resonant converter may be connected in series to the output terminal $V_{O2}$. Also, the entire output terminal of the converting circuit may be implemented in a form in which the output terminal $V_{O1}$ of the first resonant converter, the output terminal $V_{O2}$ of the second resonant converter, and the third output terminal $V_{O3}$ of the phase shift full-bridge converter are connected in series. According to the aforementioned description, the converting circuit according to the present disclosure may generate a pulse that causes the phase shift to be generated between the first control signal and the second control signal. The phase shift full-bridge converter of the converting circuit may operate by transmitting at least a portion of a DC voltage transmitted from the input terminal to the output terminal by the generated phase shift. Therefore, the converting circuit according to the present disclosure may be implemented without being limited to network structures shown in FIGS. 5A and 6A.

Figure 6B:
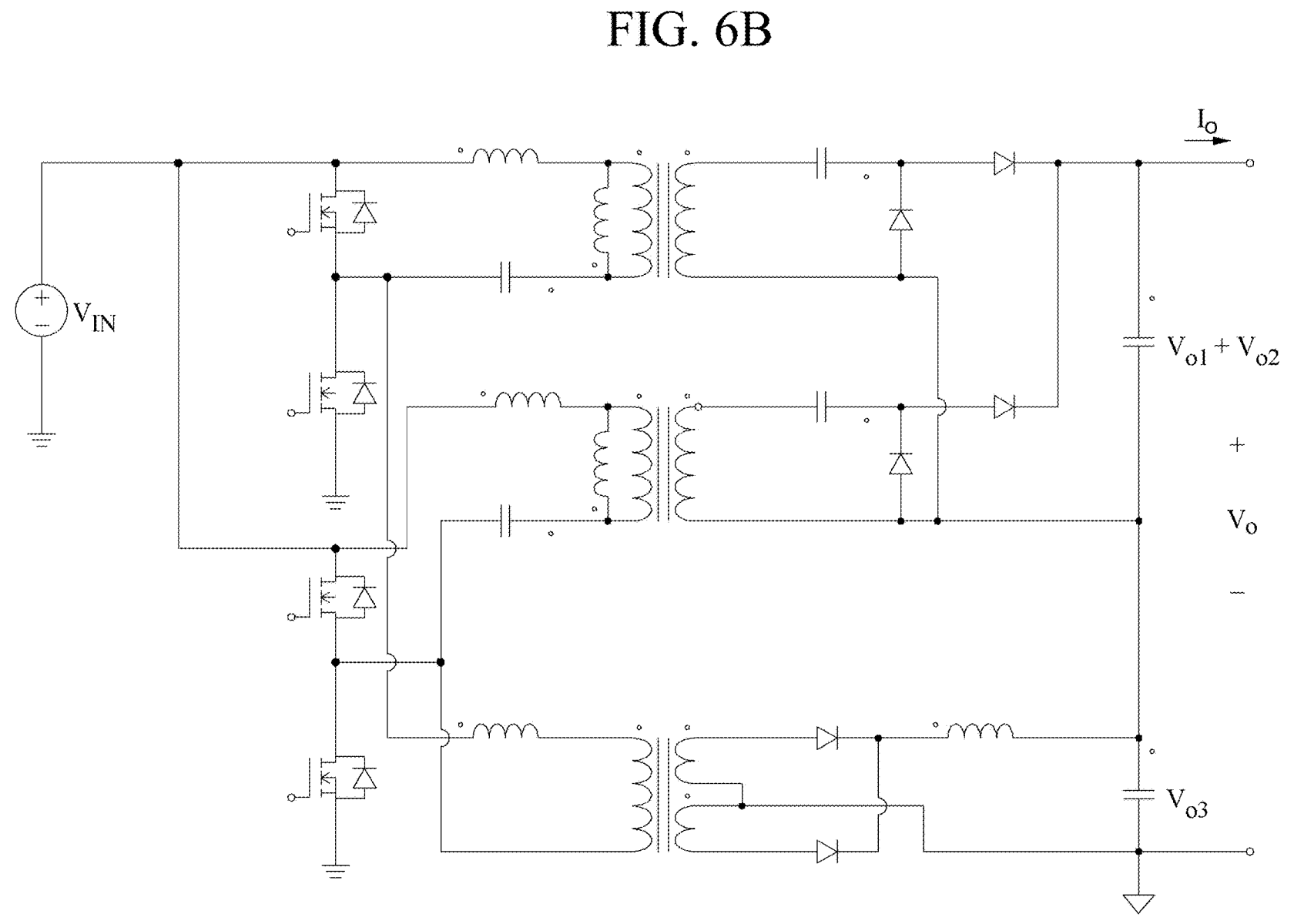

FIG. 6B illustrates a converting circuit for an on-board charging device according to another example embodiment.

Referring to FIG. 6B, the converting circuit for the on-board charging device according to another example embodiment may include a first resonant converter, a second resonant converter, a phase shift full-bridge converter, and at least one output terminal.

The first resonant converter may include at least two first switching elements and a first transformer. The first resonant converter may be constant voltage controlled such that an output voltage output from a first output terminal $V_{O1}$ may follow a predetermined ratio of a minimum voltage corresponding to specifications of a battery pack. The first resonant converter may be connected to an input voltage $V_{in}$. The first resonant converter may transmit at least a portion of a DC voltage that is transmitted from the input voltage $V_{in}$ to the first output terminal $V_{O1}$ through the first transformer according to a first control signal that is input to the at least two first switching elements. The first control signal represents a control signal of which a switching frequency is determined to follow the predetermined ratio of the minimum voltage.

The second resonant converter may include at least two second switching elements and a second transformer. The second resonant converter may be constant voltage controlled such that an output voltage output through a second output terminal $V_{O2}$ may follow the predetermined ratio of the minimum voltage corresponding to specifications of the battery pack. The second resonant converter may transmit at least a portion of the input voltage $V_{in}$ to a second output terminal $V_{O2}$ through the second transformer according to a second control signal that is input to the at least two second switching elements. The second control signal represents a control signal of which a switching frequency is determined to follow the predetermined ratio of the minimum voltage.

The phase shift full-bridge converter may include a third transformer. The phase shift full-bridge converter may transmit at least a portion of the input voltage $V_{in}$ to a third output terminal $V_{O3}$ through the third transformer according to a phase shift between the first control signal and the second control signal and a turns ratio of an input terminal and an output terminal of the third transformer.

Compared to FIG. 5A, the first resonant converter and the second resonant converter may be connected in parallel based on the input terminal. The first resonant converter and the second resonant converter may be connected in parallel to the output terminal (VO1+VO2). As described above, the converting circuit according to the present disclosure may generate a pulse that causes the phase shift to be generated between the first control signal and the second control signal. The phase shift full-bridge converter of the converting circuit may operate by transmitting at least a portion of a DC voltage transmitted from the input terminal to the output terminal by the generated phase shift. Therefore, the converting circuit according to the present disclosure may be implemented in a network structure different from those of FIGS. 5A and 6A.

According to another example embodiment, the first resonant converter and the second resonant converter may be connected in series to the input terminal. Also, the first resonant converter and the second resonant converter may be connected in parallel to the output terminal (VO1+VO2).

The description related to the example embodiments is provided such that one of ordinary skill in the art to which the present disclosure pertains may employ or implement the present disclosure. Various modifications to the example embodiments will be apparent to one of ordinary skill in the art and general principles defined herein may be applied to other example embodiments without departing from the scope of the present disclosure. Therefore, the present disclosure is not limited to the example embodiments and should be interpreted in the broadest sense consistent with the principles and novel features presented herein.

What is claimed is:

1. A converting circuit for an on-board charging device, the converting circuit comprising:

a first resonant converter including at least two first switching elements and configured to output a first output voltage under constant voltage control to follow a predetermined ratio of a minimum voltage of a battery connected to an output terminal according to a first control signal that is input to the at least two first switching elements;

a second resonant converter including at least two second switching elements and configured to output a second output voltage under constant voltage control to follow the predetermined ratio of the minimum voltage of the battery according to a second control signal that is input to the at least two second switching elements;

a phase shift full-bridge converter configured to transmit, to the output terminal, at least a portion of a direct current (DC) voltage that is transmitted from an input terminal due to a phase shift between the first control signal and the second control signal generated according to an operating mode of the battery; and a controller configured to generate a first control signal and a second control signal for determining a switching frequency to follow the predetermined ratio of the minimum voltage of the battery, and to generate a pulse of generating a phase shift between the first control signal and the second control signal for constant current control that follows a reference current value set to correspond to a charging or discharging section of the battery or for constant voltage control that follows a difference value between a maximum voltage and the minimum voltage of the battery.

2. The converting circuit of claim 1, wherein the first resonant converter is configured to connect to the input terminal and to transmit the at least a portion of the DC voltage that is transmitted from the input terminal to a first output terminal through a first transformer according to the first control signal that is input to the at least two first switching elements, the second resonant converter is configured to connect to the input terminal and to transmit the at least a portion of the DC voltage that is transmitted from the input terminal to a second output terminal through a second transformer according to the second control signal that is input to the at least two second switching elements, and the phase shift full-bridge converter includes a third transformer, and is configured to transmit the at least a portion of the DC voltage that is transmitted from the input terminal to a third output terminal through the third transformer according to the phase shift between the first control signal and the second control signal and a turns ratio of an input terminal and an output terminal of the third transformer.

3. The converting circuit of claim 2, wherein the first resonant converter includes:

a (1-1)-th switching element of which an operating mode is controlled in response to the first control signal being input to a gate node, of which a drain node is connected to one end of the input terminal, and of which a source node is connected to one end of the phase shift full-bridge converter;

a (1-2)-th switching element of which an operating mode is controlled in response to the first control signal being input to a gate node, of which a drain node is connected to the source node of the (1-1)-th switching element, and of which a source node is connected to a ground node;

a (1-1)-th resonant inductor of which one end is connected to the drain node of the (1-1)-th switching element;

a (1-2)-th resonant inductor of which one end is connected to another end of the (1-1)-th resonant inductor and which is connected in parallel to an input terminal of the first transformer;

a first resonant capacitor of which one end is connected to another end of the (1-2)-th resonant inductor and of which another end is connected to the source node of the (1-1)-th switching element; and the first transformer of which the input terminal is connected in parallel to the (1-2)-th resonant inductor and of which the output terminal is connected to the first output terminal, and the second resonant converter includes a (2-1)-th switching element of which an operating mode is controlled in response to the second control signal being input to a gate node, of which a drain node is connected to one end of the input terminal, and of which a source node is connected to another end of the phase shift full-bridge converter;

a (2-2)-th switching element of which an operating mode is controlled in response to the second control signal being input to a gate node, of which a drain node is connected to the source node of the (2-1)-th switching element, and of which a source node is connected to a ground node;

a (2-1)-th resonant inductor of which one end is connected to the drain node of the (2-2)-th switching element;

a (2-2)-th resonant inductor of which one end is connected to another end of the (2-1)-th resonant inductor and which is connected in parallel to an input terminal of the second transformer;

a second resonant capacitor of which one end is connected to another end of the (2-2)-th resonant inductor and of which another end is connected to the source node of the (2-2) switching element; and a second transformer of which the input terminal is connected in parallel to the (2-2)-th resonant inductor and of which an output terminal is connected to the second output terminal.

4. The converting circuit of claim 3, wherein a magnitude of a phase pulse of the second control signal is determined to have a phase shift with a pulse of the first control signal based on a difference between a set output voltage value and a minimum output voltage value of the on-board charging device.

* * * * *